US012172615B2

United States Patent
Leiber et al.

(10) Patent No.: US 12,172,615 B2
(45) Date of Patent: Dec. 24, 2024

(54) BRAKE SYSTEM WITH A PRESSURE SUPPLY DEVICE AND A SAFETY GATE FOR THE BRAKE CIRCUIT

(71) Applicant: IPGATE AG, Pfäffikon (CH)

(72) Inventors: Thomas Leiber, Rogoznica (HR); Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 440 days.

(21) Appl. No.: 17/429,593

(22) PCT Filed: Feb. 12, 2020

(86) PCT No.: PCT/EP2020/053655
§ 371 (c)(1),
(2) Date: Aug. 9, 2021

(87) PCT Pub. No.: WO2020/165285
PCT Pub. Date: Aug. 20, 2020

(65) Prior Publication Data
US 2022/0105918 A1 Apr. 7, 2022

(30) Foreign Application Priority Data

Feb. 12, 2019 (DE) .................... 20 2019 101 586.1
Feb. 12, 2019 (DE) .................... 20 2019 101 596.9
Mar. 21, 2019 (DE) .................... 10 2019 107 334.0

(51) Int. Cl.
*B60T 13/68* (2006.01)
*B60T 13/64* (2006.01)
*B60T 15/02* (2006.01)

(52) U.S. Cl.
CPC ............ *B60T 13/686* (2013.01); *B60T 13/64* (2013.01); *B60T 15/028* (2013.01); *B60T 2270/402* (2013.01); *B60T 2270/403* (2013.01)

(58) Field of Classification Search
CPC .......... B60T 7/042; B60T 8/88; B60T 8/4081; B60T 13/64; B60T 13/146; B60T 13/662;
(Continued)

(56) References Cited

U.S. PATENT DOCUMENTS

| 5,588,718 A | 12/1996 | Winner et al. |
| 5,986,368 A | 11/1999 | Wetzel et al. |

(Continued)

FOREIGN PATENT DOCUMENTS

| CN | 101039829 A | 9/2007 |
| CN | 101341056 A | 1/2009 |

(Continued)

OTHER PUBLICATIONS

English machined translation of DE-102012217825 A1, (Apr. 3, 2014), Abstract only.*

(Continued)

*Primary Examiner* — Robert A. Siconolfi
*Assistant Examiner* — San M Aung
(74) *Attorney, Agent, or Firm* — Panitch Schwarze Belisario & Nadel LLP

(57) ABSTRACT

A brake system includes two brake circuits having brake circuit lines for two vehicle axles and at least one hydraulic wheel brake in each brake circuit. Each wheel brake is connectable to a corresponding brake circuit or brake circuit line via a paired switch valve for pressure build-up and release in the wheel brake using a pressure supply device that can build up pressure in both brake circuits. At least one circuit separating valve blocks or releases a hydraulic connection line connecting the two brake circuits. At least one outlet valve connects an accumulator container to at least one brake circuit to release pressure. A master cylinder having only one working chamber is actuable by a brake pedal. The working chamber is connectable to the brake (Continued)

Figure 1:
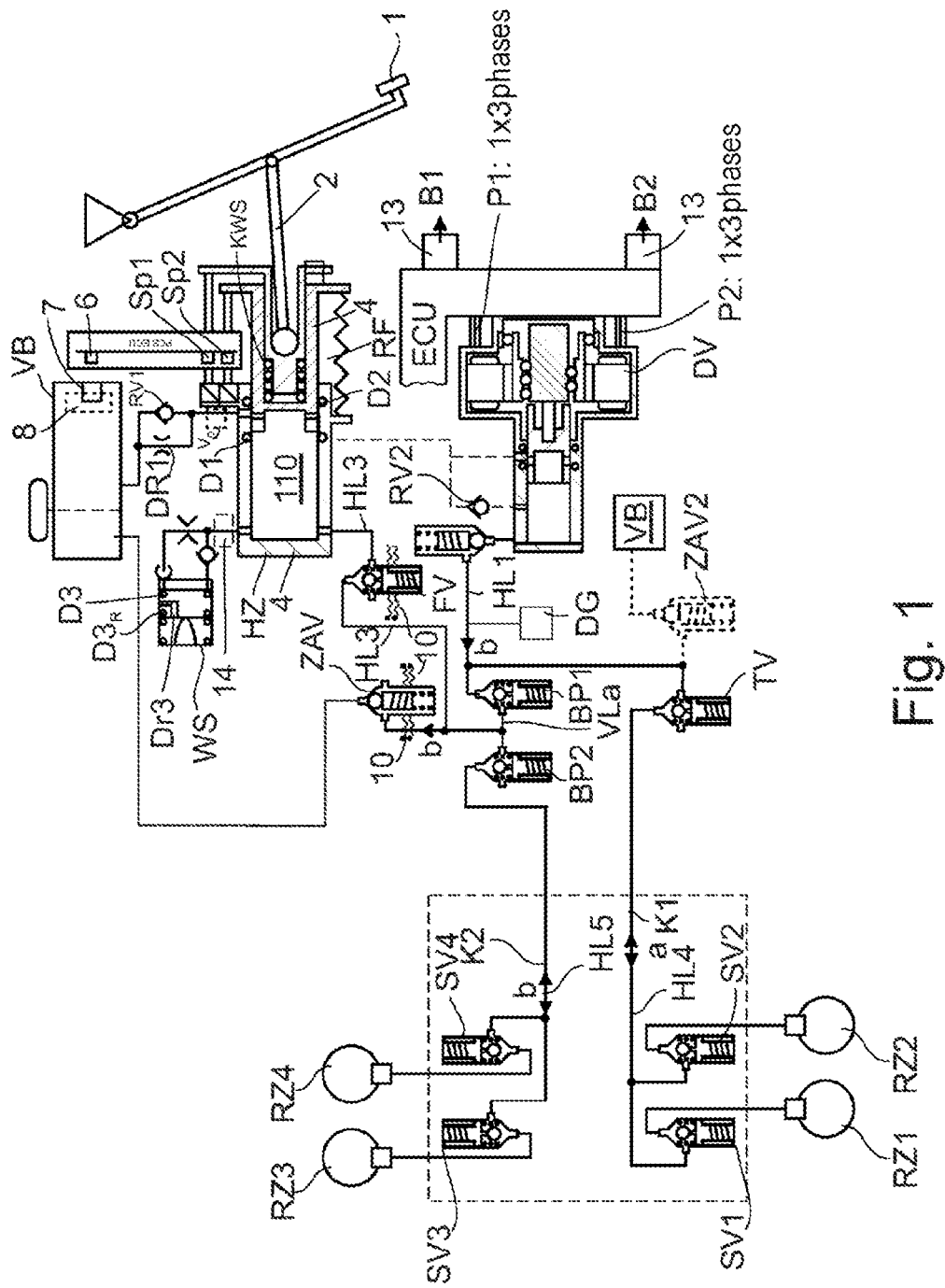

circuit line of a brake circuit. A switch valve is used to close or release the hydraulic line.

16 Claims, 4 Drawing Sheets

(58) Field of Classification Search
  CPC .... B60T 13/686; B60T 13/745; B60T 15/028; B60T 2270/402; B60T 2270/403
  USPC .......................................................... 303/2
  See application file for complete search history.

(56) References Cited

U.S. PATENT DOCUMENTS

| | | |
|---|---|---|
| 5,988,767 A | 11/1999 | Inoue et al. |
| 6,042,200 A | 3/2000 | Hosoya et al. |
| 6,517,170 B1 | 2/2003 | Hofsaess et al. |
| 9,776,604 B2 | 10/2017 | Lee et al. |
| 10,173,659 B2 | 1/2019 | Kim et al. |
| 10,513,249 B2 | 12/2019 | Kim |
| 10,688,979 B2 | 6/2020 | Leiber et al. |
| 11,554,765 B2 | 1/2023 | Leiber et al. |
| 11,565,678 B2 | 1/2023 | Zander et al. |
| 2008/0246334 A1 | 10/2008 | Drescher |
| 2009/0115247 A1 | 5/2009 | Leiber et al. |
| 2010/0001577 A1 | 1/2010 | Hatano |
| 2012/0235469 A1 | 9/2012 | Miyazaki et al. |
| 2013/0103277 A1* | 4/2013 | Attallah ............... B60T 7/122 701/70 |
| 2013/0213025 A1 | 8/2013 | Linden |
| 2014/0203626 A1 | 7/2014 | Biller et al. |
| 2014/0216866 A1 | 8/2014 | Feigel et al. |
| 2015/0203085 A1 | 7/2015 | Maruo et al. |
| 2015/0283987 A1 | 10/2015 | Bareiss |
| 2016/0009263 A1 | 1/2016 | Feigel et al. |
| 2016/0009267 A1 | 1/2016 | Lesinski, Jr. |
| 2016/0023644 A1 | 1/2016 | Feigel et al. |
| 2016/0107629 A1 | 4/2016 | Han |
| 2016/0185329 A1 | 6/2016 | Lee et al. |
| 2016/0221562 A1 | 8/2016 | Leiber et al. |
| 2016/0311422 A1 | 10/2016 | van Zanten et al. |
| 2016/0375886 A1 | 12/2016 | Jung |
| 2017/0015293 A1 | 1/2017 | Yagashira et al. |
| 2017/0106843 A1 | 4/2017 | Jeong |
| 2017/0158184 A1 | 6/2017 | Choi et al. |
| 2017/0182988 A1 | 6/2017 | Kawakami et al. |
| 2017/0327098 A1 | 11/2017 | Leiber et al. |
| 2017/0334417 A1 | 11/2017 | Choi et al. |
| 2017/0361825 A1 | 12/2017 | Drumm et al. |
| 2018/0065605 A1 | 3/2018 | Leiber et al. |
| 2018/0065609 A1 | 3/2018 | Leiber et al. |
| 2018/0126970 A1 | 5/2018 | Leiber et al. |
| 2018/0215366 A1 | 8/2018 | Leiber et al. |
| 2018/0334149 A1 | 11/2018 | Feigel |
| 2019/0031165 A1* | 1/2019 | Besier ................... B60T 8/348 |
| 2019/0100182 A1 | 4/2019 | Leiber et al. |
| 2019/0344769 A1 | 11/2019 | Zimmermann et al. |
| 2020/0047731 A1 | 2/2020 | Reuter |
| 2020/0079335 A1 | 3/2020 | Linhoff et al. |
| 2020/0079338 A1 | 3/2020 | Roh |
| 2020/0139948 A1 | 5/2020 | Leiber et al. |
| 2020/0139949 A1 | 5/2020 | Dolmaya et al. |
| 2020/0172068 A1 | 6/2020 | Leiber et al. |
| 2020/0406880 A1* | 12/2020 | Zimmermann ....... B60T 17/221 |
| 2021/0053540 A1 | 2/2021 | Besier et al. |
| 2021/0094524 A1 | 4/2021 | Wetzel |
| 2021/0179051 A1 | 6/2021 | Alford et al. |
| 2021/0245725 A1 | 8/2021 | Courth et al. |
| 2021/0309197 A1 | 10/2021 | Weh et al. |
| 2022/0041150 A1 | 2/2022 | Leiber |
| 2022/0135013 A1 | 5/2022 | Leiber et al. |
| 2023/0356700 A1 | 11/2023 | Jia et al. |
| 2024/0001899 A1 | 1/2024 | Stanojkovski |

FOREIGN PATENT DOCUMENTS

| | | | |
|---|---|---|---|
| CN | 101987616 A | 3/2011 | |
| CN | 102414063 A | 4/2012 | |
| CN | 102616229 A | 8/2012 | |
| CN | 102639370 A | 8/2012 | |
| CN | 102822025 A | 12/2012 | |
| CN | 103253251 A | 8/2013 | |
| CN | 103318160 A | 9/2013 | |
| CN | 103347754 A | 10/2013 | |
| CN | 103874609 A | 6/2014 | |
| CN | 104640755 A | 5/2015 | |
| CN | 107107885 A | 8/2017 | |
| CN | 107428325 A | 12/2017 | |
| CN | 107472232 A | 12/2017 | |
| DE | 4340467 A1 | 6/1995 | |
| DE | 19914403 A1 | 10/2000 | |
| DE | 10025038 A1 | 11/2001 | |
| DE | 10028092 A1 | 12/2001 | |
| DE | 10158065 A1 | 6/2003 | |
| DE | 10259489 A1 | 7/2004 | |
| DE | 10319338 A1 | 11/2004 | |
| DE | 102005017958 A1 | 4/2006 | |
| DE | 102005055751 A1 | 11/2006 | |
| DE | 102007016948 B3 | 8/2008 | |
| DE | 102008015241 A1 | 9/2008 | |
| DE | 102009008944 A1 | 8/2010 | |
| DE | 102009055721 A1 | 6/2011 | |
| DE | 102011086258 A1 | 5/2012 | |
| DE | 102012210809 A1 | 1/2013 | |
| DE | 102012213216 A1 | 2/2013 | |
| DE | 102012217825 A1 * | 4/2014 | ............ B60T 13/741 |
| DE | 102012025290 A1 | 6/2014 | |
| DE | 102013217954 A1 | 3/2015 | |
| DE | 102013017205 A1 | 4/2015 | |
| DE | 102013224783 A1 | 6/2015 | |
| DE | 112013004634 T5 | 6/2015 | |
| DE | 102014225962 A1 | 6/2016 | |
| DE | 202015008975 U1 | 6/2016 | |
| DE | 102015103858 A1 | 9/2016 | |
| DE | 102015104246 A1 | 9/2016 | |
| DE | 112015002162 T5 | 1/2017 | |
| DE | 102016222765 A1 | 5/2017 | |
| DE | 102016105232 A1 | 9/2017 | |
| DE | 102016203563 A1 | 9/2017 | |
| DE | 102017219257 A1 | 4/2018 | |
| DE | 102016225537 A1 | 6/2018 | |
| DE | 102017200955 A1 | 7/2018 | |
| DE | 102017219598 A1 | 7/2018 | |
| DE | 102017222435 A1 | 7/2018 | |
| DE | 102017222450 A1 | 7/2018 | |
| DE | 102017207954 A1 | 11/2018 | |
| DE | 102017113563 A1 | 12/2018 | |
| DE | 102017212016 A1 | 1/2019 | |
| DE | 102018111126 A1 | 11/2019 | |
| DE | 102019219158 A1 * | 6/2021 | |
| EP | 280740 A1 | 9/1988 | |
| EP | 2881292 A1 | 6/2015 | |
| EP | 2883766 A1 | 6/2015 | |
| EP | 2744691 B1 | 7/2015 | |
| EP | 3225480 A1 | 10/2017 | |
| EP | 3225481 A1 | 10/2017 | |
| EP | 3333031 A1 | 6/2018 | |
| GB | 589075 A | 6/1947 | |
| GB | 8514135 | 7/1985 | |
| GB | 2160273 A | 12/1985 | |
| GB | 8703148 | 2/1987 | |
| GB | 2186932 A | 8/1987 | |
| JP | H8-506301 A | 7/1996 | |
| JP | H8282459 A | 10/1996 | |
| JP | H10329699 A | 12/1998 | |
| JP | H11-348751 A | 12/1999 | |
| JP | 2001097201 A | 4/2001 | |
| JP | 2001219845 A | 8/2001 | |
| JP | 20020337679 A | 11/2002 | |
| JP | 2002541010 A | 12/2002 | |
| JP | 2006-151342 A | 6/2006 | |
| JP | 2013541462 A | 11/2013 | |
| KR | 20090077182 A | 7/2009 | |

(56) References Cited

FOREIGN PATENT DOCUMENTS

| | | |
|---|---|---|
| KR | 20170012348 A | 2/2017 |
| WO | 2006111393 A1 | 10/2006 |
| WO | 2012034661 A1 | 3/2012 |
| WO | 2012059175 A1 | 5/2012 |
| WO | 2012146461 A1 | 11/2012 |
| WO | 2013010554 A1 | 1/2013 |
| WO | 2013037568 A1 | 3/2013 |
| WO | 2014135446 A2 | 9/2014 |
| WO | 2015024795 A1 | 2/2015 |
| WO | 2015032637 A1 | 3/2015 |
| WO | 2015106892 A1 | 7/2015 |
| WO | 2016012331 A1 | 1/2016 |
| WO | 2016023994 A1 | 2/2016 |
| WO | 2016023995 A1 | 2/2016 |
| WO | 2016120292 A1 | 8/2016 |
| WO | 2016146223 A2 | 9/2016 |
| WO | 2017055152 A1 | 4/2017 |
| WO | 2017148968 A1 | 9/2017 |
| WO | 2017153072 A1 | 9/2017 |
| WO | 2018011021 A1 | 1/2018 |
| WO | 2018019671 A1 | 2/2018 |
| WO | 2018130406 A1 | 7/2018 |
| WO | 2018130482 A1 | 7/2018 |
| WO | 2018130483 A1 | 7/2018 |
| WO | 2018210534 A1 | 11/2018 |
| WO | 2018234387 A1 | 12/2018 |
| WO | 2019002475 A1 | 1/2019 |
| WO | 2019215283 A1 | 11/2019 |

OTHER PUBLICATIONS

Office Action issued Apr. 20, 2023 in European Aplication No. 19714344.9-1012 with English Translation.
Office Action issued Mar. 28, 2023 in Japanese Aplication No. 2021-547138 with English Translation.
Int'l Search Report and Written Opinion issued Oct. 22, 2019 in Int'l Application No. PCT/EP2019/068596, English translation of Int'l Search Report only.
Int'l Search Report and Written Opinion issued Oct. 30, 2019 in Int'l Application No. PCT/EP2019/057123, English translation of Int'l Search Report only.
Int'l Search Report and Written Opinion issued Nov. 4, 2019 in Int'l Application No. PCT/EP2019/068592, English translation of Int'l Search Report only.
Int'l Search Report and Written Opinion issued Apr. 1, 2020 in Int'l Application No. PCT/EP2020/053626, English translation of Int'l Search Report only.
Int'l Search Report and Written Opinion issued Apr. 28, 2020 in Int'l Application No. PCT/EP2020/053609, English translation of Int'l Search Report only.
Int'l Search Report and Written Opinion issued Apr. 28, 2020 in Int'l Application No. PCT/EP2020/053613, English translation of Int'l Search Report only.
Int'l Search Report and Written Opinion issued May 19, 2020 in Int'l Application No. PCT/EP2020/053665, English translation of Int'l Search Report only.
Int'l Search Report and Written Opinion issued May 19, 2020 in Int'l Application No. PCT/EP2020/053668, English translation of Int'l Search Report only.
Int'l Search Report and Written Opinion issued Jun. 5, 2020 in Int'l Application No. PCT/EP2020/053667, English translation of Int'l Search Report only.
Int'l Search Report and Written Opinion issued Oct. 9, 2020 in Int'l Application No. PCT/EP2020/053666, English translation of Int'l Search Report only.
Search Report issued Dec. 20, 2019 in DE Application No. 10 2019 103 464.7.
Search Report issued Jan. 3, 2020 in DE Application No. 10 2019 103 483.3.
Search Report issued Apr. 2, 2020 in DE Application No. 10 2019 107 334.0.
Office Action (First Examination Report) issued on Feb. 17, 2023, by the Intellectual Property India in corresponding India Patent Application No. 202117038290 with English Translation.
Office Action issued May 16, 2023 in Chinese Application No. 202080021255.X with English Translation.
Office Action issued May 17, 2023 in Chinese Application No. 202080021265.3 with English Translation.
Office Action issued May 22, 2023 in Chinese Application No. 202080022277.8 with English Translation.
Office Action issued Feb. 15, 2024 in European Application No. 19 742 145.6-1012 with English translation.
Office Action issued Oct. 24, 2023 in U.S. Appl. No. 17/426,615.
Notice of Allowance issued Jan. 24, 2024 in U.S. Appl. No. 17/429,608.
Corrected Notice of Allowance issued Feb. 1, 2024 in U.S. Appl. No. 17/429,608.
Office Action issued Mar. 16, 2022 in U.S. Appl. No. 17/429,620.
Office Action issued Jan. 25, 2024 n European Aplication No. 20706153.2-1012 with English Translation.
Office Action issued Feb. 29, 2024 in U.S. Appl. No. 17/429,423.
Office Action issued Nov. 24, 2023 in U.S. Appl. No. 17/429,562.
Notice of Allowance issued Mar. 6, 2024 in U.S. Appl. No. 17/429,615.
Office Action issued Dec. 7, 2023 in U.S. Appl. No. 17/429,578.
Office Action issued Mar. 14, 2024 in U.S. Appl. No. 17/429,562.
Office Action issued Mar. 28, 2024 in U.S. Appl. No. 17/429,527.
Office Action issued Mar. 14, 2024 in U.S. Appl. No. 17/429,578.
Notice of Allowance issued Mar. 27, 2024 in U.S. Appl. No. 17/429,608.
Office Action issued Jun. 3, 2024 in U.S. Appl. No. 17/429,380.
Office Action issued Mar. 12, 2024 in JP Application No. 2021-547137 with English Translation.
Office Action issued Apr. 2, 2024 in JP Application No. 2021-547135 with English Translation.
Office Action issued Mar. 12, 2024 in JP Application No. 2021-547136 with English Translation.

* cited by examiner

BRAKE SYSTEM WITH A PRESSURE SUPPLY DEVICE AND A SAFETY GATE FOR THE BRAKE CIRCUIT

CROSS-REFERENCE TO RELATED APPLICATION

This application is a Section 371 of International Application No. PCT/EP2020/053655, filed Feb. 12, 2020, which was published in the German language on Aug. 20, 2020 under International Publication No. WO 2020/165285 A1, which claims priority under 35 U.S.C. § 119(b) to German Patent Application No. 20 2019 101 586.1, filed Feb. 12, 2019, German Patent Application No. 20 2019 101 596.9, filed Feb. 12, 2019, and German Patent Application No. 10 2019 107 334.0, filed Mar. 21, 2019, the disclosures of which are incorporated herein by reference.

The present invention relates to a brake system having two brake circuits, each having a brake circuit line, and which is suitable for two vehicle axles, wherein at least one hydraulically acting wheel brake is provided in each brake circuit, and each hydraulically acting wheel brake is connectable by means of a respectively assigned switching valve to its brake circuit or to the brake circuit line thereof, wherein the pressure build-up and the pressure reduction in the respective wheel brake is performed via the respectively assigned switching valve. The brake system furthermore has a pressure supply device, wherein a pressure build-up is performed or can be performed in both brake circuits by means of the pressure supply device, and that at least one circuit isolation valve, which is in particular open when electrically deenergized, is provided and serves for selectively shutting off and opening up a hydraulic connecting line that connects the two brake circuits.

PRIOR ART

In recent years, there has been a trend in brake systems toward the integrated version, the so-called 1-box, with integration of electrohydraulic brakes (E-Boost) with master brake cylinder, "drive-by-wire" and ABS/ESP function. The systems differ substantially in the structural design of the pressure provision device and in the valve circuit. Here, simplified circuits using so-called multiplex technology (MUX) without an outlet valve and with pressure modulation by means of the pressure provision device are also known. There are also alternatives to the tandem master brake cylinder, for example with a separating chamber between the pressure supply piston and the floating piston, and more recently also single master brake cylinders without a floating piston. A diagnostic valve is always provided for the diagnosis of the tandem master brake cylinder. The brake systems furthermore have significant differences in terms of fail safety.

A wide variety of concepts and components are already known inter alia from the following patent documents. For example, EP3333031 discloses a brake system with a tandem master brake cylinder (THZ), DE102014111594 and DE102018111126 disclose a tandem master brake cylinder with pressure supply (THZ+DV), DE102017201243 discloses a pressure supply device (DV), DE102017219598 discloses a single master brake cylinder (SHZ) and DE10309145 discloses a diagnostic valve.

Use is increasingly being made of hydraulic systems with two or more circuits, wherein the safety requirements for these hydraulic systems are increasing. In particular for, the following fault situations and functions must be taken into consideration or provided:

a. The failure or malfunction of one hydraulic circuit must not affect the function of the other hydraulic circuit;
b. If only one pressure supply device is present, a pressure build-up by means of a master brake cylinder actuatable by way of a brake pedal must still be possible in the event of failure of the pressure supply device, that is to say in the emergency level;
c. If only one pressure supply devices is available, an auxiliary pressure supply with low power for so-called emergency operation must be present for the event of failure thereof;
d. In the hydraulic circuits, a supply must be provided to closed-loop control systems which require both an open-loop-controlled and/or closed-loop-controlled pressure increase and also an open-loop-controlled and/or closed-loop-controlled pressure reduction for closed-loop control operation.

For the fail safety of the hydraulic system, it is necessary to always use diagnostic functions or programs to trace faults in the hydraulic system and to implement corresponding measures. In particular, it is highly important to pay attention to single and double faults.

Possible single and double faults in a hydraulic system will be discussed below on the basis of a two-circuit brake system.

The extent to which a vehicle can take over the tasks of the driver when required, and how man and machine interact on the road today and will do so in the future, are covered in the various development steps. The five levels of automation of the vehicle are often referred to, which are listed below:

Level 1: Assisted driving, in the case of which driver assistance systems assist the driver but are not yet capable of controlling the vehicle themselves;
Level 2: Partially automated driving, in the case of which systems can take over inter alia the steering of the vehicle, but the driver always remains responsible;
Level 3: Highly automated driving, in the case of which the driver can divert their attention from the driving situation for longer periods of time in certain situations;
Level 4: Fully automated driving, in the case of which the vehicle drives predominantly independently, but the driver must be capable of driving;
Level 5: Autonomous driving, in the case of which the vehicle takes over all driving functions and the persons in the vehicle are purely passengers.

Whether single and/or double faults in a brake system can be tolerated therefore depends on the degree of automation or the abovementioned level of the vehicle.

I. Single Fault

In the case of a brake system for a level 2 vehicle, single faults are permitted if the minimum braking action of approximately <0.3 g is still achieved. Such a low level of braking deceleration can however already be classed as posing an extremely high risk of accidents.

In the case of a brake system for a level 3 vehicle, a braking deceleration of at least 0.5 g should be achieved, wherein the ABS function must also be ensured.

II. Double Fault with Total Brake Failure

In many systems, double faults are accepted if the probability of failure based on ppm and FIT data is low.

A risk is posed in particular by dormant faults if no corresponding diagnosis is performed.

In the case of high safety requirements, critical single faults, which for example cause the braking action to be reduced to less than 0.5 g, should be preventable through redundancies and identifiable by means of diagnostic functions. and A typical case of a dormant fault is outlined below:

The brake system has, for example, only one pressure supply device which provides a supply to two brake circuits with four wheel brakes via infeed valves. As soon as one of the four wheel brakes fails, this fault cannot be localized. As a result, the entire pressure supply fails. By means of an auxiliary pressure supply, such as the master brake cylinder which is actuatable by means of the brake pedal, only one brake circuit can still be supplied with a reduced pressure level. Owing to the critically low pressure level, it is also the case that only a very weak and therefore dangerous braking action is achieved. It is normally the case that important components cannot be diagnosed either. For example, a solenoid valve, which is always open in the normal situation, cannot be diagnosed with regard to its leak-tightness, because the leak and thus the fault only occur upon a change to another operating state.

A double fault with a dormant fault occurs, for example, in the event of failure of the one brake circuit which is connected to the other brake circuit via only one circuit isolation valve. The circuit isolation valve, which is open in the normal situation, must be closed in the event of failure of the brake circuit. However, owing to a (dormant) fault, said circuit isolation valve does not close completely, such that the other brake circuit consequently also fails, which leads to a total failure of the brake system.

The main costs in a brake system arise from the (tandem) master brake cylinder, the pressure supply device and from the number and type of valves required, the pressure transducer and the open-loop and closed-loop control device.

OBJECT OF THE INVENTION

The object on which the invention is based consists in reducing costs and structural volume and in providing a brake system with improved safety and/or probability of fault-induced failure.

Said object and further advantages may be achieved by means of a brake system according to one or more of the accompanying claims.

ADVANTAGES OF THE INVENTION

The brake system according to the invention is advantageously characterized in that it operates with a small number of valves, in particular switching valves, whereby the structure is simplified, the structural space required is small and is furthermore inexpensive. This is possible in particular owing to the special construction of the safety gate, by means of which the two brake circuits can selectively be isolated from or connected to one another. At the same time, the brake system according to the invention has a very high level of fail safety and a low probability of failure. Furthermore, the brake system according to the invention offers numerous diagnostic options for the ascertainment of faults, in particular dormant faults. Even if faults occur, the brake system generally still provides a sufficient brake pressure or a sufficiently high level of braking deceleration.

Owing to the special valve circuit, the master brake cylinder can still be utilized for providing pressure in the event of failure of the pressure supply device, wherein, in a hazardous situation or in the event of locking of the wheels, a reduction of pressure can advantageously be performed in open-loop-controlled or closed-loop-controlled fashion via an outlet valve. Here, the pressure reduction, in particular the progression thereof over time, can be precisely controlled in open-loop or closed-loop fashion by means of a valve controlled with a pulse-width-modulated signal. During the pressure reduction, the master brake cylinder must then be separated from the brake circuit by means of a valve. After the pressure reduction phase, the master brake cylinder can then be reconnected to the brake circuit in order that a pressure build-up can be performed again.

As already stated, the brake system according to the invention has diagnostic capability, such that it can for example identify the complete or partial failure of a component. Furthermore, monitoring of the brake fluid level can advantageously be performed, wherein this may be performed by means of a level sensor in the reservoir, whereby even small leaks in the hydraulic brake system, in particular from the brake system to the outside, can be identified and reacted to accordingly.

Furthermore, the single master brake cylinder may be designed to be fail-safe. Owing to the special valve circuit, it is advantageously possible, in the event of a failure of one wheel brake cylinder, for the functionality of the other three wheel brake cylinders to be ensured by closure of a valve.

Depending on the valve circuit used, different levels of safety can be achieved, with level 2/2+ being the basis for the brake system according to the invention.

The brake system according to the invention has significantly greater fail safety than previously known brake systems with regard to occurring faults in the event of failure of a wheel brake cylinder, failure of the single master brake cylinder with travel simulator and also in the event of failure of the infeed valve. Through the provision of an additional redundant winding, the motor of the pressure supply device can be connected by way of 2×3 phases to the motor controller, resulting in an increase in the fail safety specifically for this component, and the pressure supply thus has a probability of failure that is less than the probability of failure for a failure of a wheel brake cylinder.

The brake system according to the invention advantageously has at least one central outlet valve, by means of which a reservoir is connectable to at least one wheel brake cylinder for pressure reduction directly or via a circuit isolation valve. The pressure in one wheel brake cylinder can be reduced via the outlet valve, wherein a pressure reduction can be performed in another wheel brake cylinder at the same time or in a temporally overlapping manner. Also, a supply can be provided to both brake circuits by means of the master brake cylinder in the event of failure of the pressure supply device.

The brake system according to the invention has only a single pressure supply device, which is electromotively driven.

If the pressure supply device has a pump, such as a piston-cylinder pump, by means of which not only the pressure build-up but also a pressure reduction can be performed, a switchable infeed valve is advantageously arranged between the brake circuit and the pump, by means of which an outflow of hydraulic medium into the pump in the event of failure of the pump can be prevented. If, for the pressure supply device, a pump is used only for the pressure build-up, then a simple check valve is sufficient for preventing the undesired backflow out of the brake circuit into the pump.

In order that a braking operation can still be performed in the event of failure of the pressure supply device, the brake system according to the invention has a master brake cylinder with a piston which can be actuated by an actuating device, in particular in the form of a brake pedal, and which is connected to a brake circuit or to the safety gate via a hydraulic line, which can be selectively shut off by means of a switching valve which is in particular open when electrically deenergized. The working chamber of the master brake cylinder may optionally be connected to a travel simulator.

In an advantageous refinement of the brake system described above, electromotive wheel brakes are provided for braking a vehicle wheel of a vehicle axle, in particular in each case one vehicle wheel of each vehicle axle. These electromotive wheel brakes may advantageously each additionally have a hydraulic connection, wherein this is hydraulically connected or connectable to a brake circuit line via a hydraulic connecting line which can be selectively closed by means of a switching valve. By means of the pressure generated by the pressure supply device or the master brake cylinder, it is thus advantageously possible for an additional braking torque for the assigned vehicle wheel to be generated, which acts alone or so as to assist the electromotively generated braking force.

By means of the outlet valve described above, it is advantageously possible for a pressure reduction in a brake circuit or a wheel brake to be performed directly into the reservoir via the brake circuit line. In this way, it is advantageously possible that the pressure reduction is performed in at least one hydraulically acting wheel brake either by means of the pressure supply device or via an outlet valve in a manner dependent on the state of the hydraulic system and/or on the closed-loop pressure control situation.

The pressure supply device may have either a piston-cylinder pump or a rotary pump, in particular in the form of a gear pump.

If only one circuit isolation valve is provided, by means of which the two brake circuits can be hydraulically connected to one another or isolated from one another, the infeed hydraulic line and the brake circuit line of the first brake circuit can be connected to a connection, in particular to the valve-seat-side connection, of the circuit isolation valve. The brake circuit line of the second brake circuit is then connected to the other connection of the circuit isolation valve. It is however likewise possible for the connections for the brake circuits to be interchanged. This above-described construction yields a particularly inexpensive and at the same time fail-safe brake system which requires only few switching valves. In the case of this brake system, the direct connection of the master brake cylinder is advantageously realized via a hydraulic line which is connected to the brake circuit which is connected via the single circuit isolation valve to the pressure supply device. In this way, the master brake cylinder and the pressure supply device are separated from one another by means of at least two valves, whereby a redundancy is advantageously formed.

The circuit isolation valve(s) form(s) a safety gate (SIG). If an additional isolation valve is provided for the selective isolation of a brake circuit line, this isolation valve can also be considered as belonging to the safety gate SIG.

An additional outlet valve for the first brake circuit may be provided, by which a pressure reduction in said brake circuit can likewise be performed. This additional outlet valve is to be provided in particular if no pressure reduction is possible by means of the pump of the pressure supply device itself. This may be the case if, for example, a rotary pump is provided as the pump. Hydraulic medium can then be discharged from the brake circuit line directly into the reservoir via the additional outlet valve.

In the brake system according to the invention, the switching valve assigned to the respective wheel brake cylinder can be utilized for controlled pressure reduction, in particular preferably by means of a pulse-width modulated signal, whereby the rate of pressure change can advantageously be controlled in open-loop or closed-loop fashion. In this way, the pressure change or the progression thereof over time can be set, or set by closed-loop control, for example in a manner dependent on the braking situation or vehicle situation. For this purpose, use may also be made of a pressure transducer in order to ascertain the present pressure in the brake circuit and to use this as an input variable for a closed-loop controller.

The pressure reduction for the ABS function is also possible or realizable by means of the switching valves and an outlet valve. Here, the switching valve may be controlled by means of a pulse-width-modulated signal. If the pressure reduction also is performed via a circuit isolation valve to the pressure supply or to the reservoir, the circuit isolation valve may also be controlled by means of a pulse-width-modulated signal. The remaining valves through which flow passes in the hydraulic connection between the wheel brake cylinder and the reservoir are then permanently open during the pressure reduction.

To increase the functional reliability, an additional isolation valve, which is in particular open when electrically deenergized, may be arranged in the brake circuit line of the first brake circuit, which additional isolation valve serves for shutting off the first brake circuit with respect to the safety gate and the pressure supply device.

In the case of the according to the invention, in the event of failure or leakage of the switching valve that can decouple the master brake cylinder from the rest of the brake system, the function of the travel simulator can advantageously be maintained by virtue of the single circuit isolation valve or the two circuit isolation valves being closed. In the event of a total failure of the switching valve, a pressure build-up can then be performed by means of the pressure supply device only in the first brake circuit, whereby 50% of the braking action of the brake system remains available in the case of a diagonal distribution. If the front axle is assigned to the first brake circuit, 60% is still available. By contrast, if there is an only slight leak in the switching valve, an additional brake pressure build-up can be performed in the second brake circuit by means of the actuating device and the master brake cylinder, and thus approximately 75% of the actual braking action is still available for emergency braking. In this case, the change in the pedal characteristic in relation to the travel simulator is also no longer great. In this case, no ABS function is possible. In this case, the wheels can lock, in particular in the presence of a low coefficient of friction. If the valve FV now has a low leakage rate, ABS is possible by virtue of the valve FV being closed and $P_{reduction}$ being performed via valves SV and ZAV. In this case, the valve FV in brake circuit BK2 remains closed. For $P_{build-up}$, a smaller pressure difference is selected in relation to $P_{reduction}$ in order to prevent renewed locking. Both valves SV remain closed for the rest of the braking operation. Thus, in this special case, steerability is maintained.

The pressure reduction can then still be performed, as described above, in the second brake circuit, in particular also for the ABS function, via the outlet valve.

The second circuit isolation valve BP2 offers additional safety in the event of failure of the valve FV, wherein a failure may be present for example owing to a leak or a fault in the electrical connection. In the event of this fault, the two circuit isolation valves BP1 and BP2 are closed, whereby the travel simulator function of the travel simulator WS is advantageously maintained. In this case, braking operation is performed by means of the pressure supply device DV in the first brake circuit BK1 with approximately 50% braking action in the case of a diagonal brake circuit distribution. In the event of an emergency braking operation with a higher braking action desired by the driver, the circuit isolation valve BP2 may optionally be opened, in which case an additional pressure can then be generated in the second brake circuit BK2 by way of the foot-imparted force, which can increase the braking action by over 75%. In this case, the change in the pedal characteristic in relation to the travel simulator is also no longer great. However, in the event of failure of the valve FV, no ABS function is possible. In this case, the wheels can lock, in particular in the presence of a low coefficient of friction. However, if the valve FV only has a low leakage rate, the ABS function is still possible by virtue of the valve FV being closed and the pressure reduction $P_{reduction}$ being performed via the respective switching valve SV and the outlet valve ZAV. In this case, the valve FV remains closed. For the pressure build-up $P_{build-up}$, a smaller pressure difference is selected in relation to the pressure reduction $P_{reduction}$ in order to prevent renewed locking of the vehicle wheels. Both switching valves SV remain closed for the rest of the braking operation. Thus, in this special case, steerability is maintained.

For the abovementioned fault situations, a diagonal brake circuit distribution is more favorable owing to the greater braking action of 50% in relation to the front axle/rear axle brake circuit distribution. Here, in the event of failure of the front axle VA, only approximately 30% is available with the rear axle HA. In the case of the circuit with the so-called emergency braking, approximately 75% applies independently of the VA/HA brake circuit distribution and diagonal brake circuit distribution.

With the brake system according to the invention, a modified closed-loop control concept for the ABS function can be used while maintaining the basic algorithms, wherein significantly fewer valves are required for this and pressure measurement can also be performed during the pressure build-up.

Various possible embodiments of the brake system according to the invention will be discussed below with reference to drawings.

Figure 2:
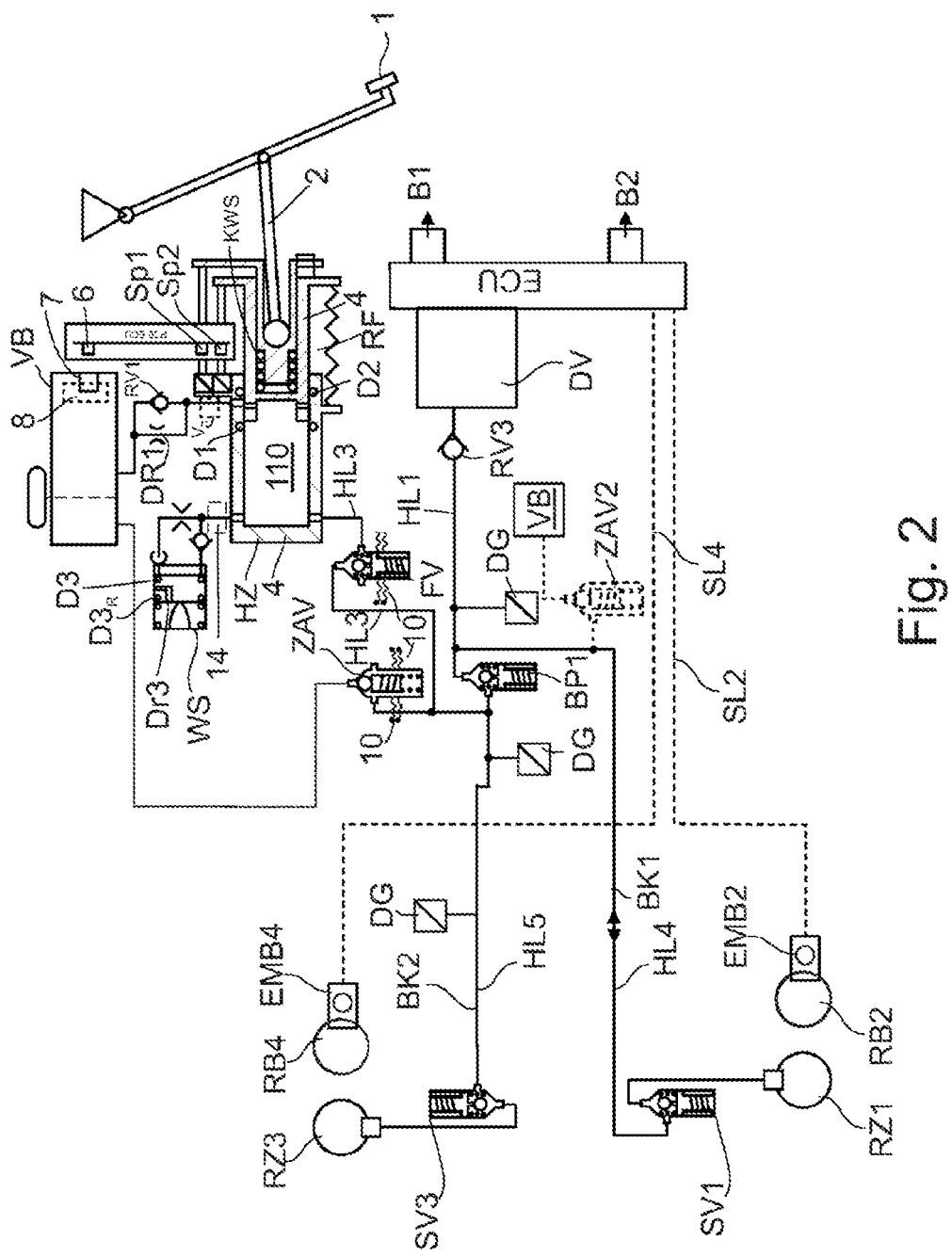
Figure 3:
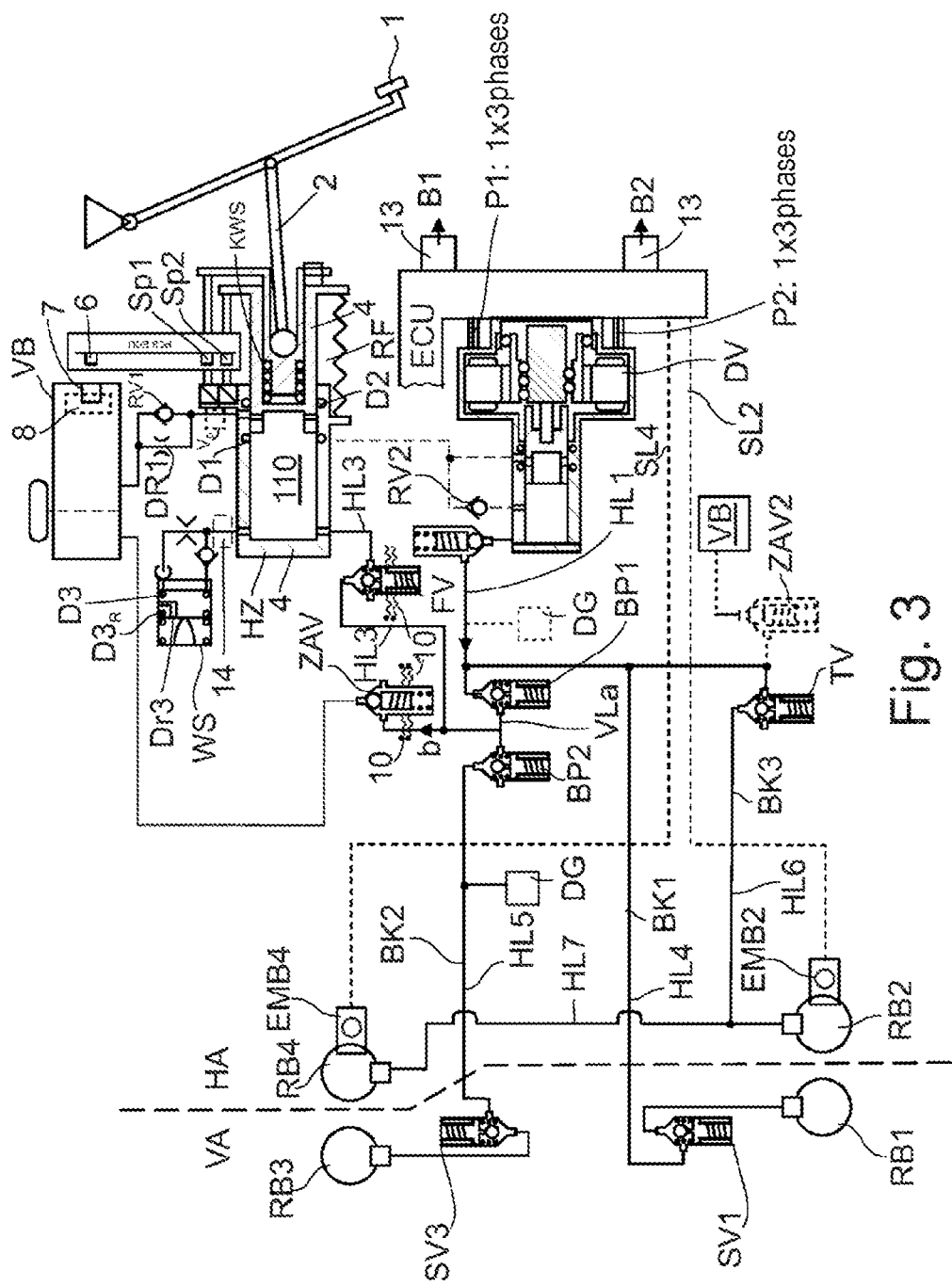
Figure 4C:
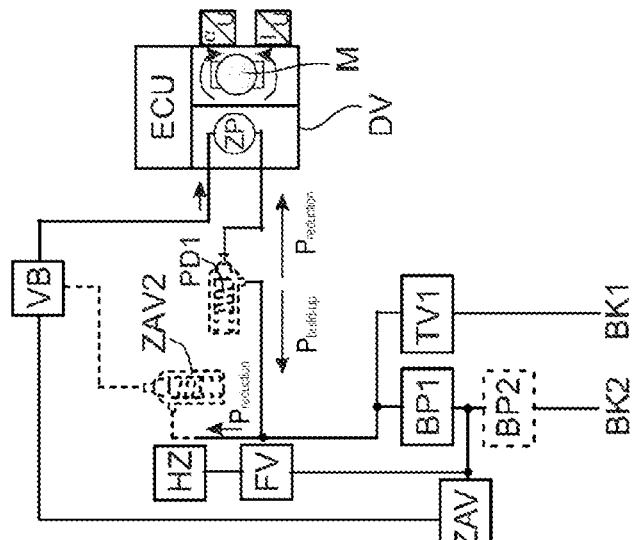
Figure 4B:
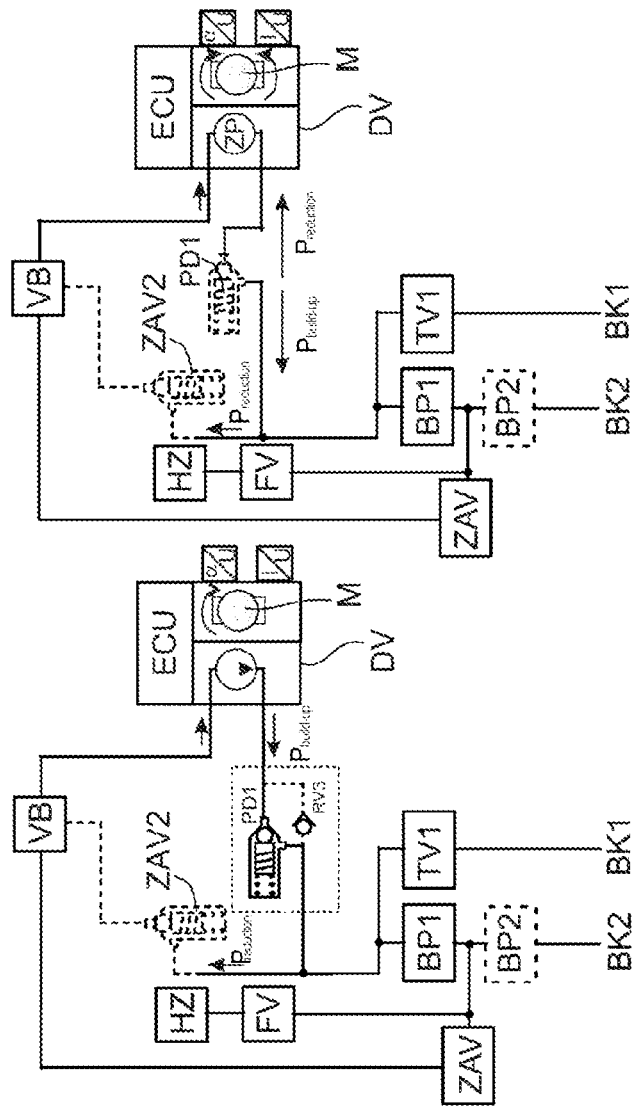
Figure 4A:
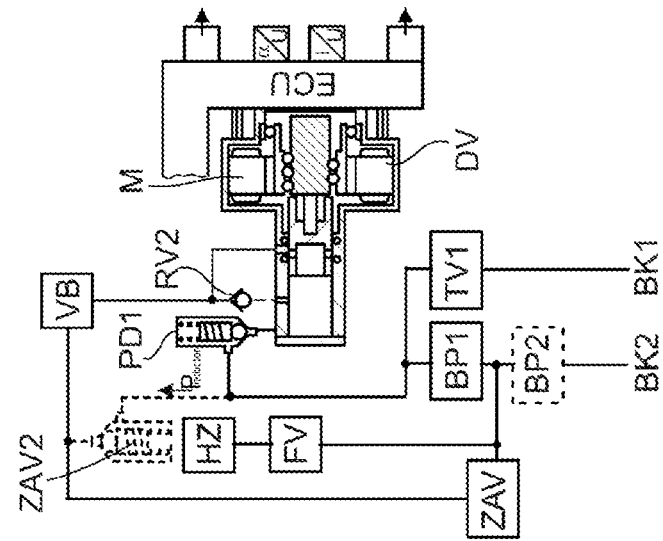

In the drawings:

FIG. 1: shows a first possible embodiment of the brake system according to the invention with a single master brake cylinder with travel simulator, valve circuit and pressure supply device with open-loop and closed-loop control unit and a safety gate with two circuit isolation valves;

FIG. 2: shows a second possible embodiment of the brake system according to the invention with a single master brake cylinder with travel simulator, valve circuit and pressure supply device with open-loop and closed-loop control unit and a safety gate with hydraulically acting wheel brakes are provided at the front axle and electromechanical brakes are provided at the rear axle;

FIG. 3: shows a third possible embodiment of the brake system according to the invention with a single master brake cylinder with travel simulator, valve circuit and pressure supply device with open-loop and closed-loop control unit and a safety gate with two series-connected circuit isolation valves, wherein in each case hydraulically acting wheel brakes are provided at the front axle and hydraulically assisted electromechanical brakes are provided at the rear axle;

FIGS. 4*a-c*: show different valve circuits for three different configurations of the pressure supply device.

FIG. 1 shows a first possible embodiment of the brake system according to the invention, wherein the single electromotively driven pressure supply device DV acts from the brake circuit BK1 into the brake circuit BK2 via the hydraulic lines line HL1, VLa and HL5 via the switching valves SV and the circuit isolation valves BP1 and BP2 to the wheel brake cylinders RZ3 and RZ4. In relation to the prior art, two circuit isolation valves BP1 and BP2 are used for circuit isolation. The invention therefore provides two redundant valves as safety features BP1 and BP2 in order to allow the connection to the brake circuit BK2 from the pressure supply device DV. In the event of failure of the pressure supply device DV, for example in the event of failure of a piston seal, imparting of a reaction to the brake circuit BK2 via the three redundant valves BP1, BP2 and PD1 is prevented. The valves BP1 and BP2 are preferably valves which are open when electrically deenergized, in order that, in the event of failure of the pressure supply device DV, the master brake cylinder SHZ can act on both brake circuits BK1 and BK2. If pressure is reduced by way of the opening of the valves ZAV and FV, the two circuit isolation valves open automatically, without dedicated electrical actuation thereof, owing to the acting pressure difference.

The switching valves have the following functions:
a) Brake circuit failure at a wheel brake cylinder RZi. This failure is identified by way of the additional volume intake/delivery of the pressure supply device DV in relation to the so-called p-v characteristic curve, which is read in as a vehicle characteristic curve during the end of line inspection or is measured at intervals in the vehicle. This identification method is known per se. However, in the case of normal brake systems, it is difficult to identify which wheel brake cylinder is affected or faulty.

In the brake system according to the invention, however, this fault can be localized relatively easily and quickly. If the abovementioned deviation is discovered, a pressure is firstly built up, and then the circuit isolation valve BP1 is closed and the subsequent pressure progression is measured. A check is thus performed as to whether one or both of the wheel brake cylinders RZ3 and RZ4 are faulty. If the pressure changes, this is a sign that at least one of the two wheel brake cylinders is faulty. Next, to check which of the two wheel brake cylinders is faulty, the switching valve SV3 of the wheel brake cylinder RZ3 is closed. If the pressure now remains constant, the failure lies in the wheel brake cylinder RZ4. If, by contrast, the pressure changes, a failure of the wheel brake cylinder RZ3 is present. If the pressure does not change, both wheel brake cylinders RZ3 and RZ4 are functioning correctly. Subsequently, to check the wheel brake cylinders of the other brake circuit, the circuit isolation valve BP1 is opened and the switching valves SV3 and SV4 are closed. The switching valve SV1 is then closed. If the pressure remains constant, this is a sign that the wheel brake cylinder RZ2 is faulty. If, by contrast, the pressure changes, a failure of the wheel brake cylinder RZ1 is present. The wheel brake cylinders of the first brake circuit BK1 can also be checked at the same time or in parallel with the wheel brake cylinders of the second brake circuit BK2 by using the pressure supply device DV to measure the pressure progression. If the pump moves in the presence of a constant current, this is a sign of a pressure drop if one of the switching valves SV1 or SV2 is open.

b) The brake circuits BK1 and BK2 are safeguarded by the interconnection of the two circuit isolation valves BP1 and BP2. The braking action is therefore still greater than 70% in the event of failure of one wheel brake cylinder. There would have to be a triple fault, that is to say both valves BP1 and BP2 would additionally have to fail, for a total failure of the brake system to occur. At least one brake circuit is thus reliably protected against double faults and prevents a total failure of the brake system. Safety with respect to double faults, if dormant faults can occur, is a crucial safety feature. If the optional isolation valve TV1 is used, the first brake circuit BK1 is also reliably protected against double faults, whereby, even in the event of a double fault in the event of a failure of one wheel brake cylinder RZi, three wheel brake cylinders can still be used by means of the switching valves SVi.

The pedal movement is measured by means of redundant pedal travel sensors, which at the same time act on a force-travel sensor (KWS) measuring element as described in WO2012/059175 A1. The pressure supply device DV is controlled with the signal from the pedal travel sensors, wherein the piston control causes the volume flow in the hydraulic main line HL1 in the brake circuit BK1 and via the redundant circuit isolation valves BP1 and BP2 into the second brake circuit BK2.

The pedal actuation moves the piston 3, which, by way of the pressure proportional to the pedal force, acts on the known travel simulator WS and thus determines the pedal characteristic. The travel simulator WS can commonly be shut off by means of a valve 14, in particular in the fall-back level in the case of a failed pressure supply device. Through the provision of redundant windings with 2×3 phase connection (P1 and P2) and in particular relatively simple rotary pumps, the failure rate of the pressure supply device DV is far below the value of a brake circuit failure in systems without drive-by-wire with additional pedal collapse. Therefore, the valve 14 can in principle also be omitted.

The master brake cylinder SHZ can be connected via the line HL2, HL3 to the brake circuits BK1 or BK2, wherein the valve FV is arranged in the line HL2, HL3 for the purposes of isolating the two line sections HL2 and HL3. This connection is effective only in the fall-back level. If the master brake cylinder SHZ is connected to the connecting line VLa of the two circuit isolation valves BP1 and BP2, the two valves BP1 and BP2 form a further redundancy. A conventional connection from the valve FV directly into one of the two brake circuits BK1, BK2 would, in the case of a leaking valve FV, have the result that the brake circuit and thus the pressure supply device DV act on the piston 3, which conventionally leads to the pressure supply being shut off.

The second circuit isolation valve BP2 offers additional safety in the event of failure of the valve FV, wherein a failure may be present for example owing to a leak or a fault in the electrical connection. In the event of this fault, the two circuit isolation valves BP1 and BP2 are closed, whereby the travel simulator function of the travel simulator WS is advantageously maintained. In this case, braking operation is performed by means of the pressure supply device DV in the first hydraulic circuit BK1 with approximately 50% braking action in the case of a diagonal brake circuit distribution. In the event of an emergency braking operation with a higher braking action desired by the driver, the circuit isolation valve BP2 may optionally be opened, in which case an additional pressure can then be generated in the second hydraulic circuit or brake circuit BK2 by way of the foot-imparted force, which can increase the braking action by over 75%. In this case, the change in the pedal characteristic in relation to the travel simulator is also no longer great. However, in the event of failure of the valve FV, no ABS function is possible. In this case, the wheels can lock, in particular if the coefficient of friction is low. However, if the valve FV only has a low leakage rate, the ABS function is still possible by virtue of the valve FV being closed and the pressure reduction $P_{reduction}$ being performed via the respective switching valve SV and the outlet valve ZAV. In this case, the valve FV remains closed. For the pressure build-up $P_{build-up}$, a smaller pressure difference is selected in relation to the pressure reduction $P_{reduction}$ in order to prevent renewed locking of the vehicle wheels. Both switching valves SV remain closed for the rest of the braking operation. Thus, in this special case, steerability is maintained.

For the abovementioned fault situations, a diagonal brake circuit distribution is more favorable owing to the greater braking action of 50% in relation to the front axle/rear axle brake circuit distribution. Here, in the event of failure of the front axle VA, only approximately 30% is available with the rear axle HA. In the case of the circuit with the so-called emergency braking, approximately 50% applies independently of the VA/HA brake circuit distribution, and 75% applies in the case of the diagonal brake circuit distribution.

In FIG. 1, the alphabetic characters a and b are used to denote different functions in the two brake circuits BK1 and BK2 in the event of a fault of the valve FV:

Case a) Braking is performed only by means of the first brake circuit BK1 with the pressure supply device DV if relatively intense braking is desired by the driver, which applies for example in the case of emergency braking that can be identified by way of Sp1.

Case b) Braking is performed by means of the pressure supply device DV in the first brake circuit BK1. Here, the valve FV has only a slight leak. With the master brake cylinder SHZ, a pressure can be built up in the second brake circuit BK2. If the ABS function is required, a pressure reduction $P_{reduction}$ can be implemented via the outlet valve ZAV. The pressure build-up $P_{build-up}$ is performed by means of the pressure supply device DV to a reduced pressure level. After a certain time, in which a further pressure build-up $P_{build-up}$ takes place, the ABS function responds again.

In addition to the function in the event of failure of the switching valve FV, the second function is the closed-loop control function (unchanged for decades) for ABS. In a first stage during the pressure reduction $P_{reduction}$, if the closed-loop controller reports that a wheel for example the criterion of excessive pressure, the pressure build-up $P_{build-up}$ can be stopped for the purposes of observation of the wheel. If the closed-loop controller now sends the signal "excessive braking torque/pressure", the pressure reduction $P_{reduction}$ is performed. In this case, the outlet valve ZAV is opened and the respectively associated switching valve SVi is preferably switched by way of pulse width modulation PWM, whereby the rate of the pressure reduction $P_{reduction}$ can be controlled. The pressure reduction $P_{reduction}$ is stopped by the closed-loop controller by virtue of the valves SV and ZAV being closed again. Here, circuit isolation valves BP1 and BP2 are open. It is also possible for two or four wheel brake cylinders RZ to be controlled simultaneously in the pressure reduction mode $P_{reduction}$, or the pressure reduction $P_{reduction}$ is performed in the second brake circuit BK2 via the outlet valve ZAV and in the first brake circuit by means of the pressure supply device DV or via an optional additional outlet valve ZAV2.

The pressure reduction $P_{reduction}$ may also be performed in the second brake circuit BK2 via the outlet valve ZAV and in the first brake circuit BK1 by means of the pressure supply device DV, which in this case likewise acts merely as a pressure sink.

The third function is the pressure reduction $P_{reduction}$ in the case of a normal brake. There are two possibilities here:
a. The pressure reduction $P_{reduction}$ is performed via all four switching valves SV1-4 with a brief stoppage, for example in accordance with Δt or Δp across the outlet valve ZAV, for pressure equalization in the two brake circuits, because the switching valves SV1-4 are subject to tolerances. The pressure reduction $P_{reduction}$ may also be performed in open-loop-controlled or closed-loop-controlled fashion by means of pulse-width-modulated switching valves SV.
b. The pressure reduction $P_{reduction}$ is performed either via the outlet valve ZAV or by means of the single master brake cylinder SHZ, and that one of the circuit isolation valves BP1/BP2, if it is flowed through by the hydraulic medium, can be controlled by means of a pulse-width-modulated signal for open-loop and/or closed-loop pressure control.

FIG. 1 also illustrates the main structural units of master brake cylinder SHZ, valve arrangement HCU and open-loop and closed-loop control device ECU. By way of the brake pedal 1 and the pedal plunger 2, pressure is generated by means of the piston 3, which pressure passes via the valve FV, which is open when electrically deenergized, into the second brake circuit BK2 and via the circuit isolation valve BP1, which is likewise open when electrically deenergized, into the first brake circuit BK1. The piston 3 has the primary seal D2 and secondary seal D1 which are connected via the check valve RV1 and the throttle Da to the reservoir VB. These components have an important safety function. If the seal D2 fails, the leakage flow is throttled by means of the throttle Dr1, such that an insignificantly small piston-pedal movement is the result, for example 0.2 mm/s=2 mm in 10 s, that is to say approximately 0.05%. The average braking time is approximately 3 s to decelerate a vehicle from 100 km/h at 1 g. This means that the pedal movement in the event of failure is very small and, on the other hand, owing to the throttle Dr1, a failure of the seal D2 does not lead to failure of the single master brake cylinder SHZ. The check valve RV1 has the task of allowing simple ventilation, by virtue of the single master brake cylinder SHZ conveying the volume via the ventilation screw on check valve RV1. Brake fluid is drawn in via the check valve RV1. The seals D2 and D1 are relevant to safety. Seal D2 is safeguarded by throttle Dr1, and seal D1 is safeguarded by diagnostic functions. For this reason, the seal D1 is diagnosed or checked in terms of its function upon every parking stoppage, for example by virtue of the residual pressure in the brake passing via the open valve FV into the master brake cylinder SHZ. Here, by means of the pressure transducer DG, the pressure change is measured for example over for example 10 s, which then corresponds to a leak in the brake system as a whole. If this is determined, a second test is performed by virtue of the switching valves SV to the wheel cylinders RZ1-4 being closed and a certain pressure, for example 20 bar, being generated by the pressure supply device DV and being measured again by the pressure sensor DG. Here, the delivery rate can be measured for example from the angular movement of the drive motor. If this is greater than the known delivery rate of the throttle Dr1, the seal D1 is leaking. As an alternative to the throttle Da with check valve RV1, use may also be made of a solenoid valve MV which is open when electrically deenergized, though this is associated with considerable additional costs. In the normal situation, the master brake cylinder (SHZ) piston 3 delivers the volume into the travel simulator WS with the valve FV closed. This is the basic component of the "drive by wire" system.

The function of the travel simulator WS is standard. Its piston has elastic elements that generate a certain pressure-dependent force. Since the pedal force is converted into pressure and piston travel, a particular pedal travel force characteristic can be generated by way of the travel sensor (WS) piston with the travel sensor (WS) force.

As is known, the pedal characteristic in the travel simulator system is always the same and is independent, for example, of the failure of a brake circuit and does not generate a collapse of the pedal and has major advantages in, for example, electric vehicles with recuperation by means of the electric motor. Here, the driver determines how much brake pressure, in addition to the braking torque of the electric motor, the pressure supply device DV must generate for the desired braking action. The pedal travel is measured redundantly by means of the pedal travel sensors and determines the brake pressure that is generated by the pressure supply device DV and measured by the pressure sensor DG.

There are various solutions for implementing the redundant pedal travel sensors. These are also described inter alia in PCT/EP2016/055471.

The redundant pedal travel sensors may be coupled to two pistons, as illustrated, and a spring between the two pistons. This has the advantage that force-travel measurement can thus be realized, with additional advantages of the fault analysis, for example with regard to a jamming piston 3. This is disclosed inter alia in DE102010050132.

In the event of failure of the pressure transducer DG, the pressure can also be set by way of the motor current, because in this case the current-pressure relationship for the pressure increase and pressure reduction $P_{build-up}$ and $P_{reduction}$ is stored in a characteristic map. The travel simulator WS has two seals D3 and D3r. Downstream of the seal D3, there is provided a redundant seal D3r with throttle Dr3, which has the same function as throttle Dr1. In the event of failure of the seal D3, a leakage flow arises which is throttled by means of the throttle Dr3 and which does not lead to failure of the master brake cylinder SHZ. The diagnosis is performed together—as described—with the seals D1 and D2. The travel simulator WS has a conventional throttle for the pedal movement together with a check valve RV for rapid emptying of the travel simulator WS.

With the seal and throttle configuration, a fail-safe single master brake cylinder SHZ is created, which is of great importance if a tandem master brake cylinder HZ with redundant piston is omitted.

The pressure supply device DV is illustrated only in principle and is described in detail in PCT/EP2018/071923. The infeed valve PD1 has a safety function in the event of failure of the pressure supply device DV. Brake fluid can be replenished from the reservoir VB via the check valve RV2. The infeed valve PD1 may also be omitted if the pump of the pressure supply device DV is self-locking and the pump does not allow any pressure reduction in the brake circuit even in the absence of a functioning drive.

The valves, the pressure supply device DV and the master brake cylinder SHZ are combined in one block. According to the prior art, the open-loop and closed-loop control device ECU comprises all electrical and electronic components and electrical connections to the sensors and the solenoid valves via the coils connected to the circuit board PCB. The connection to the on-board electrical system is realized via the plug connector 13 (single or twofold).

FIG. 2 shows a simplified solution of the safety gate SIG with only one circuit isolation valve BP1 for a mixed brake system with an electromechanical rear axle brake.

The master brake cylinder SHZ corresponds to the master brake cylinder illustrated in FIG. 1. The safety gate SIG with its valve BP1 allows, together with the outlet valve ZAV, the valve FV and the switching valves SV, almost all functions that have been described in the case of the brake system according to FIG. 1. Without the second circuit isolation valve BP2, the second brake circuit BK2 is however not fail-safe with respect to double faults in the case of a faulty valve FV. Here, the pressure supply device DV is separated from the brake circuit BK1 by means of the check valve RV3, such that, if a rotary piston pump is used, no hydraulic medium can flow from the brake circuit BK1 back into the pump.

Electromagnetic brakes EMB are used at the rear axle HA, which according to the prior art can also perform the function of the parking brake and can also be utilized for the ABS function. The electrical functions are contained in the open-loop and closed-loop control unit ECU. An additional outlet valve ZAV2, which is illustrated by dashed lines, may optionally also be provided for the brake circuit BK1, via which additional outlet valve a pressure reduction $P_{reduction}$ is possible by dissipation to the reservoir VB.

FIG. 3 shows again the safety gate SIG from FIG. 1 with the same pressure supply device DV, outlet valve ZAV and valve FV, with the brake circuits BK1 and BK2 and the master brake cylinder SHZ and the open-loop and closed-loop control unit ECU. By contrast to the electromechanical brake EMB illustrated in FIG. 2, the electromechanical brakes used at the rear axle are additionally hydraulically assisted. These brakes are known from PCT/EP2019/061909. Here, the two hydraulically assisted electromechanical brakes EMB2 and EMB4 are assigned to the third brake circuit BK3 and perform the function of the primary brakes with ABS function and the function of the parking brake. The EMB function is limited here to the fixing of the braking action of the parking brake by means of a correspondingly structured configuration, see PCT/EP2019/061909, and for the ABS function in the emergency level, in particular in the event of failure of the pressure supply device. The advantage is significantly lower costs for the hydraulically assisted electromagnetic brake EMB2, EMB4, which is similar to the present-day parking brake, wherein the motor however has a higher power output for emergency operation for the rear axle (HA) brake and also the ABS function in the event of failure of the pressure supply device DV. Here, too, an additional outlet valve ZAV2, which is illustrated by dashed lines, may optionally also be provided for the brake circuit BK1, via which additional outlet valve a pressure reduction $P_{reduction}$ is possible by dissipation to the reservoir VB.

FIGS. 4a-4c show variants of the pressure supply device DV, wherein the valve circuits of the safety gate SIG are the same as those of FIGS. 1 to 3.

FIG. 4a corresponds here to FIG. 1.

FIG. 4b shows an embodiment with a piston pump with an additional central outlet valve ZAV for the pressure reduction $P_{reduction}$, because this is not possible with the outlet valves of the piston pump. As an alternative to the infeed valve PD1, a check valve RV3 may be used, see FIG. 2.

FIG. 4c shows a gear pump which requires the switchable infeed valve PD1 owing to the leakage flow. The advantage of the gear pump is the volume delivery in two directions, such that both a closed-loop-controlled pressure build-up and a closed-loop-controlled pressure reduction can be implemented therewith. If the pump used has no leakage flow, the valve PD1 may also be omitted.

In all solutions, the pressure supply device DV provides both an angle signal of the rotor and the current measurement of the EC motor.

LIST OF REFERENCE DESIGNATIONS

SHZ Single master brake cylinder
ECU Electronic open-loop and closed-loop control unit
HCU Hydraulic control unit
KWS Force-travel sensor
RV1 Check valve 1
RV2 Check valve 2
RV3-6 Check valve 3-6
RF Resetting spring
Dr 1-3 Throttles
RZ1-4 Wheel cylinders
SV 1-4 Switching valves
DV Electromotive pressure provision unit
HL 1, 3, 4, 5 Hydraulic line connections
VB Reservoir
ZAV1/2 Central outlet valve
BP1/2 Circuit isolation valve
FV Infeed valve from master brake cylinder SHZ into brake circuit BK
SV Switching valve to wheel cylinder RZ
DG Pressure transducer p=f(v)
V Diagnostic valve
E Valve spring
WS Travel simulator, piston
D1-3 Seals
Sp1,2 Pedal travel sensors
TV1 Isolation valve
SIG Safety gate
EMB Electromotive brake
a) $P_{build-up}/P_{reduction}$ in the event of a fault of infeed valve FV with pressure supply DV in brake circuit BK1
b) $P_{build-up}/P_{reduction}$ in the event of a fault of infeed valve FV with pressure supply DV and master brake cylinder SHZ with ABS
1 Brake pedal
2 Pedal plunger
3 Master brake cylinder (HZ) piston
4 Master brake cylinder (HZ) housing
5 PCB
6 Sensor element for level transducer
7 Sensor target
8 Float in the reservoir
9 Electrical elements for travel simulators for force characteristic
10 Redundant electrical connection, possibly with redundant coil
11 Redundant connection to motor for 2×3 phase winding
12 Redundant connection for 2×3 phase motor
13 Electrical plug connector for on-board electrical system connection
14 Travel simulator isolation valve

What is claimed is:

1. A brake system comprising the following:
 a respective electromechanical brake at each wheel of a rear axle of a vehicle,
 two brake circuits, each with a respective brake circuit line for at least one hydraulically acting wheel brake cylinder of a front axle of the vehicle,
 wherein each respective hydraulically acting wheel brake cylinder of the at least one hydraulically acting wheel brake cylinder is connectable by means of a respectively assigned first switching valve to the one of the two brake circuits in which the respective hydraulically acting wheel brake cylinder is disposed or to a brake circuit line of that one of the brake circuits, wherein pressure build-up in the respective hydraulically acting wheel brake cylinder is performed via the respective assigned first switching valves, and wherein pressure reduction in the at least one hydraulically acting wheel brake cylinder is performed via the respectively assigned first switching valve of the at least one hydraulically acting wheel brake cylinder,
 a pressure supply device, wherein a pressure build-up in the at least one hydraulically acting wheel brake cylinder is enabled to be performed via each respective brake circuit by means of the pressure supply device,
 a control unit arranged to control the pressure supply device and the electromechanical brakes, and
 a master brake cylinder which is actuatable by a brake pedal, and which has only one working chamber, wherein the working chamber is connected via a hydraulic line directly to the brake circuit line of one of the brake circuits,
 wherein a second switching valve that is open when electrically deenergized is arranged to selectively close or open a connection between the hydraulic line and a brake circuit of the two brake circuits, and/or wherein a circuit isolation valve is arranged to selectively close or open a hydraulic line between the pressure supply device and the master brake cylinder or between the pressure supply device and a brake circuit of the two brake circuits.

2. The brake system as claimed in claim 1, wherein the circuit isolation valve is arranged to selectively shut off or open up a hydraulic connecting line that connects the two brake circuits.

3. The brake system as claimed in claim 1, further comprising at least one outlet valve by means of which a reservoir is connectable to at least one of the brake circuits or to at least one wheel brake for pressure reduction.

4. The brake system as claimed in claim 1, wherein when the second switching valve is open, the working chamber is hydraulically connectable or connected to at least one of the brake circuit lines via a respective circuit isolation valve.

5. The brake system as claimed in claim 1, further comprising an infeed hydraulic line arranged to hydraulically connect the pressure supply device to a respectively assigned brake circuit, wherein either an infeed valve is arranged to selectively shut off and open up the hydraulic line or a check valve is arranged to prevent a backflow from the brake circuit into the pressure supply device.

6. The brake system as claimed in claim 1, further comprising an electromotive wheel brake arranged for braking a vehicle wheel of an axle of the two vehicle axles.

7. The brake system as claimed in claim 6, wherein the electromotive wheel brake additionally has a hydraulic connection that is hydraulically connected or connectable to a brake circuit line of the two brake circuit lines via a hydraulic connecting line enabled to be selectively closed by means of a third switching valve, wherein, by means of pressure generated by the pressure supply device or the master brake cylinder, a braking torque for the respectively assigned vehicle wheel of the brake circuit line of the two brake circuit lines is enabled to be generated, which acts alone or so as to assist electromotively generated braking force produced by the electromotive wheel brake.

8. The brake system as claimed in claim 6, wherein pressure reduction is performed in at least one hydraulically acting wheel brake either by means of the pressure supply device or via an outlet valve in a manner dependent on a state of the hydraulic system containing the two brake circuits and/or on a closed-loop pressure control situation.

9. The brake system as claimed in claim 1, wherein the pressure supply device includes a piston-cylinder pump or a rotary pump.

10. The brake system as claimed in claim 9, wherein, in the case of the rotary pump being provided for the pressure supply device, the brake system further comprises an outlet valve arranged to selectively shut off and open up a hydraulic connecting line that connects the first brake circuit directly, without further interposed valves, to a reservoir.

11. The brake system as claimed in claim 1, wherein in an anti-lock braking system (ABS) function of the brake system, pressure reduction is performed in at least one wheel brake via the assigned first switching valve and an outlet valve.

12. The brake system as claimed in claim 1, wherein a central outlet valve and/or the second switching valve has two controllable electrical coils, such that, in the event of failure of a first one of the two controllable electrical coils or of the control thereof, the central outlet valve and/or the second switching valve is still switchable by means of a second one of the two controllable electrical coils, and/or wherein a redundant valve is connected in parallel or in series with respect to the second switching valve and/or the central outlet valve.

13. The brake system as claimed in claim 1, further comprising a reservoir, wherein the reservoir has at least one level transducer, and wherein a sensor is provided for detecting a position of the at least one level transducer, wherein the sensor is arranged in an open-loop and closed-loop control unit, and wherein a level of hydraulic fluid in the reservoir is continuously ascertainable or ascertained by means of the level transducer and the sensor.

14. The brake system as claimed in claim 1, wherein the pressure supply device includes a motor, wherein the motor is connected to an open-loop and closed-loop control device of the pressure supply device via a twofold three-phase connection.

15. The brake system as claimed in claim 1, wherein the assigned first switching valves, the second switching valve, the pressure supply device, the master brake cylinder, and a reservoir are combined in one structural unit.

16. The brake system as claimed in claim 1, wherein a fourth switching valve is provided between each wheel brake cylinder and the pressure supply device, wherein, in a case of failure of a wheel brake cylinder, functionality of the wheel brake cylinder that has not failed is secured by shutting off the fourth switching valve of the failed wheel brake cylinder;
 and/or
  wherein a valve arrangement is arranged between each of the wheel brake cylinders and the pressure supply device, wherein, in the case of failure of a wheel brake cylinder, the functionality of the wheel brake cylinder that has not failed is secured by shutting off one of the valves of the valve arrangement;

and/or wherein the master brake cylinder is enabled to be connected to one brake circuit or both brake circuits via one valve or several valves.

* * * * *